US010232903B2

(12) United States Patent
Kato

(10) Patent No.: US 10,232,903 B2
(45) Date of Patent: Mar. 19, 2019

(54) INVERTED PENDULUM VEHICLE

(71) Applicant: HONDA MOTOR CO., LTD., Minato-Ku, Tokyo (JP)

(72) Inventor: Seiji Kato, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 85 days.

(21) Appl. No.: 15/614,948

(22) Filed: Jun. 6, 2017

(65) Prior Publication Data
US 2017/0355413 A1 Dec. 14, 2017

(30) Foreign Application Priority Data
Jun. 9, 2016 (JP) .................. 2016-115115

(51) Int. Cl.
B62K 11/00 (2006.01)
B60K 1/02 (2006.01)
B62K 1/00 (2006.01)
B62K 3/00 (2006.01)
B62K 17/00 (2006.01)

(52) U.S. Cl.
CPC ............ B62K 11/007 (2016.11); B60K 1/02 (2013.01); B60L 2200/16 (2013.01); B60L 2220/46 (2013.01); B60L 2260/34 (2013.01); B62K 1/00 (2013.01); B62K 3/00 (2013.01); B62K 17/00 (2013.01)

(58) Field of Classification Search
CPC .................................................. B62K 11/007
See application file for complete search history.

(56) References Cited

U.S. PATENT DOCUMENTS

| 9,061,721 | B2 * | 6/2015 | Muto ..................... B62H 1/02 |
| 9,511,656 | B2 | 12/2016 | Muto et al. |
| 9,630,447 | B2 * | 4/2017 | Yoshino .............. B60B 19/003 |
| 10,071,782 | B2 * | 9/2018 | Yoshino .............. B62K 11/007 |
| 2018/0111655 | A1 * | 4/2018 | Inada .................. B62K 11/007 |

FOREIGN PATENT DOCUMENTS

| JP | H04-130596 U | 11/1992 |
| JP | 2013-237327 A | 11/2013 |
| JP | 2014-234035 A | 12/2014 |

OTHER PUBLICATIONS

Extended European Search Report dated Oct. 24, 2017 issued in the corresponding European Application No. 17174706.6.

* cited by examiner

Primary Examiner — Kevin Hurley
(74) Attorney, Agent, or Firm — Carrier Blackman & Associates, P.C.; Joseph P. Carrier; William D. Blackman

(57) ABSTRACT

In an inverted pendulum vehicle (10) including a vehicle body frame (12) fitted with a saddle (32) at an upper end thereof; a main wheel (40) combining a plurality of free rollers (44) arranged along a circle such that rotational center lines of the free rollers are each directed along a tangential line of the circle, a pair of drive disks (50) each carrying a plurality of free rollers (52) arranged along a circumferential direction and configured to engage the free rollers of the main wheel, and a pair of drive units (72, 86) including a pair of electric motors (68, 82) for individually driving the drive disks under an inverted pendulum control, the two drive units are positioned one behind the other between the saddle and a rotational center line of the main wheel.

8 Claims, 7 Drawing Sheets

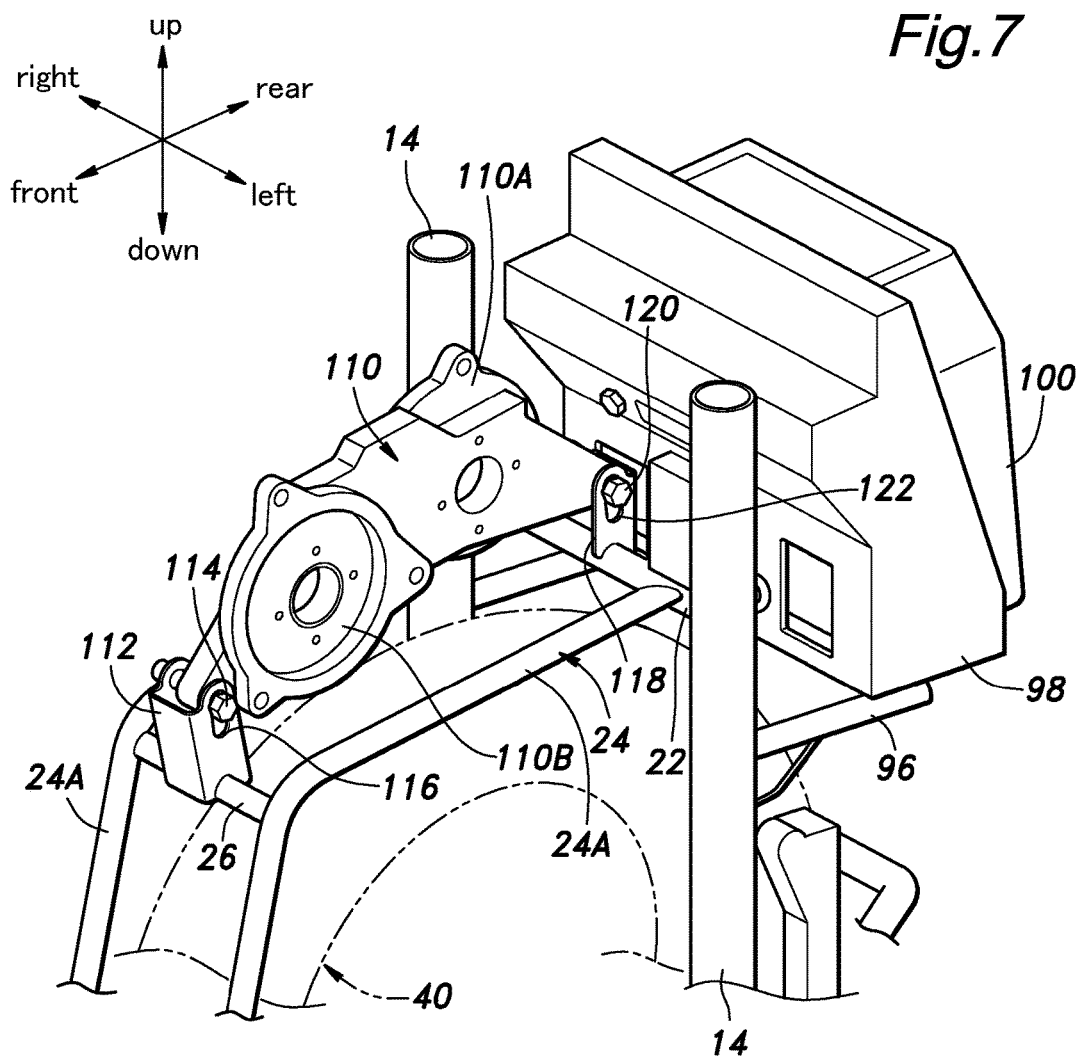

INVERTED PENDULUM VEHICLE

TECHNICAL FIELD

The present invention relates to an inverted pendulum vehicle, and in particular to an arrangement of electric drive units in a vehicle body frame of an inverted pendulum vehicle.

BACKGROUND ART

JP2013-237327A and JP2014-234035A disclose an inverted pendulum vehicle comprising a vehicle body frame, a main wheel combining a plurality of free rollers arranged along a circle such that the rotational center lines of the free rollers are each directed along the tangential line of the circle, a pair of drive disks each carrying a plurality of free rollers configured to engage the free rollers of the main wheel, a pair of drive units including a pair of electric motors for individually driving the drive disks under an inverted pendulum control, a battery mounted on the vehicle body frame to supply electric power to the electric motors, and a saddle mounted on the vehicle body frame for seating a rider.

In the inverted pendulum vehicle disclosed in JP2013-237327A, the two drive units are positioned between the main wheel and the saddle in a vertically offset relationship relative to each other, and the battery is mounted on a rear end of the vehicle body frame.

In the inverted pendulum vehicle disclosed in JP2014-234035A, the two drive units are positioned between the main wheel and the saddle on either side of the vehicle body frame in a vertically aligned relationship, and the battery is mounted on a rear end of the vehicle body frame.

When the two drive units are vertically offset relative to each other as disclosed in JP2013-237327A, the lateral dimension of the vehicle can be reduced, but the vertical dimension of the part of the vehicle body frame occupied by the drive units is significant. Therefore, the saddle is required to be placed in a relatively high position so that the diameter of the main wheel has to be reduced for a rider of a short stature to be comfortably seated.

When the two drive units are vertically aligned to each other as disclosed in JP2014-234035A, the vertical dimension of the part of the vehicle body frame occupied by the drive units is reduced, but the lateral dimension of the vehicle has to be increased. Therefore, the legs of the rider have to be spread apart so that a rider of a short stature may not be comfortably seated.

SUMMARY OF THE INVENTION

In view of such problems of the prior art, a primary object of the present invention is to provide an inverted pendulum vehicle that can prevent the saddle to be positioned undesirably high, and the lateral dimension of the vehicle to be limited so that a person of a short stature can ride the vehicle comfortably.

To achieve such an object, the present invention provides an inverted pendulum vehicle, comprising: a vehicle body frame (12); a main wheel (40) combining a plurality of free rollers (44) arranged along a circle such that rotational center lines of the free rollers are each directed along a tangential line of the circle; a pair of drive disks (50) each carrying a plurality of free rollers (52) arranged along a circumferential direction and configured to engage the free rollers of the main wheel; a pair of drive units (72, 86) including a pair of electric motors (68, 82) for individually driving the drive disks under an inverted pendulum control; a battery (100) mounted on the vehicle body frame to supply electric power to the electric motors; and a saddle (32) mounted on the vehicle body frame for seating a rider; wherein the two drive units are positioned one behind the other between the saddle and a rotational center line of the main wheel.

Because the two drive units are positioned one behind the other, the vertical dimension of the space for accommodating the drive units can be minimized as compared to the case where the two drive units are positioned one above the other. Therefore, the saddle is not required to be positioned at an undesirably high position. Also, the lateral space for accommodating the drive units can be minimized as compared to the case where the two drive units are positioned laterally one next to the other. Therefore, the rider is not required to excessively spread the legs when riding the vehicle.

Preferably, one of the drive units (86) is positioned substantially on a vertical line passing through the rotational center line of the main wheel in an upright condition of the vehicle, and the other drive unit (72) is positioned in front of the one drive unit.

Thereby, the gravitational center of the vehicle including the rider may be positioned substantially on the vertical line so that the fore and aft balance of the vehicle can be optimized.

Preferably, the drive units are provided with respective drive pulleys, the drive disks are provided with respective driven pulleys, and an endless belt is passed around each drive pulley and the corresponding driven pulley, the two drive units being positioned on a same circle centered around the rotational center line of the main wheel.

Thereby, the belt transmission mechanisms for the two drive units consist of identically configured units.

Preferably, the two drive units are arranged such that output ends of the drive units are directed away from each other.

Thereby, the two drive units can be arranged in a symmetric relationship (mirror image of each other) so that the lateral balance of the vehicle can be enhanced.

Preferably, the two drive units are arranged such that the two drive units overlap each other in front view.

Thereby, the lateral extent of the two drive units can be minimized so that the rider is not required to spread the legs to an excessive extent.

Preferably, the two drive units are mounted on the vehicle body frame via a common mounting member in an individually adjustable manner.

Thereby, the tension of the two endless belts can be individually adjusted by using a simple structure.

The mounting member may comprise a vertical plate member extending orthogonally to a lateral direction, and the electric motors of the two drive units are mounted on opposite sides of the vertical plate.

Thereby, the mounting structure for the two drive units can be simplified, and the tension of the endless belt can be adjusted individually by using a simple structure.

Preferably, the battery is positioned behind the drive units. Thereby, the battery does not interfere with the positioning of the saddle.

According to the present invention, the height of the saddle is prevented from becoming excessive, and the lateral dimension of the vehicle may be minimized so that the rider can be seated on the saddle in a comfortable manner while maintaining the balance of the vehicle in a favorable manner.

BRIEF DESCRIPTION OF THE DRAWINGS

FIG. 7 is a perspective view similar to FIG. 6 with the drive units omitted from illustration.

DESCRIPTION OF THE PREFERRED EMBODIMENT(S)

Figure 1:
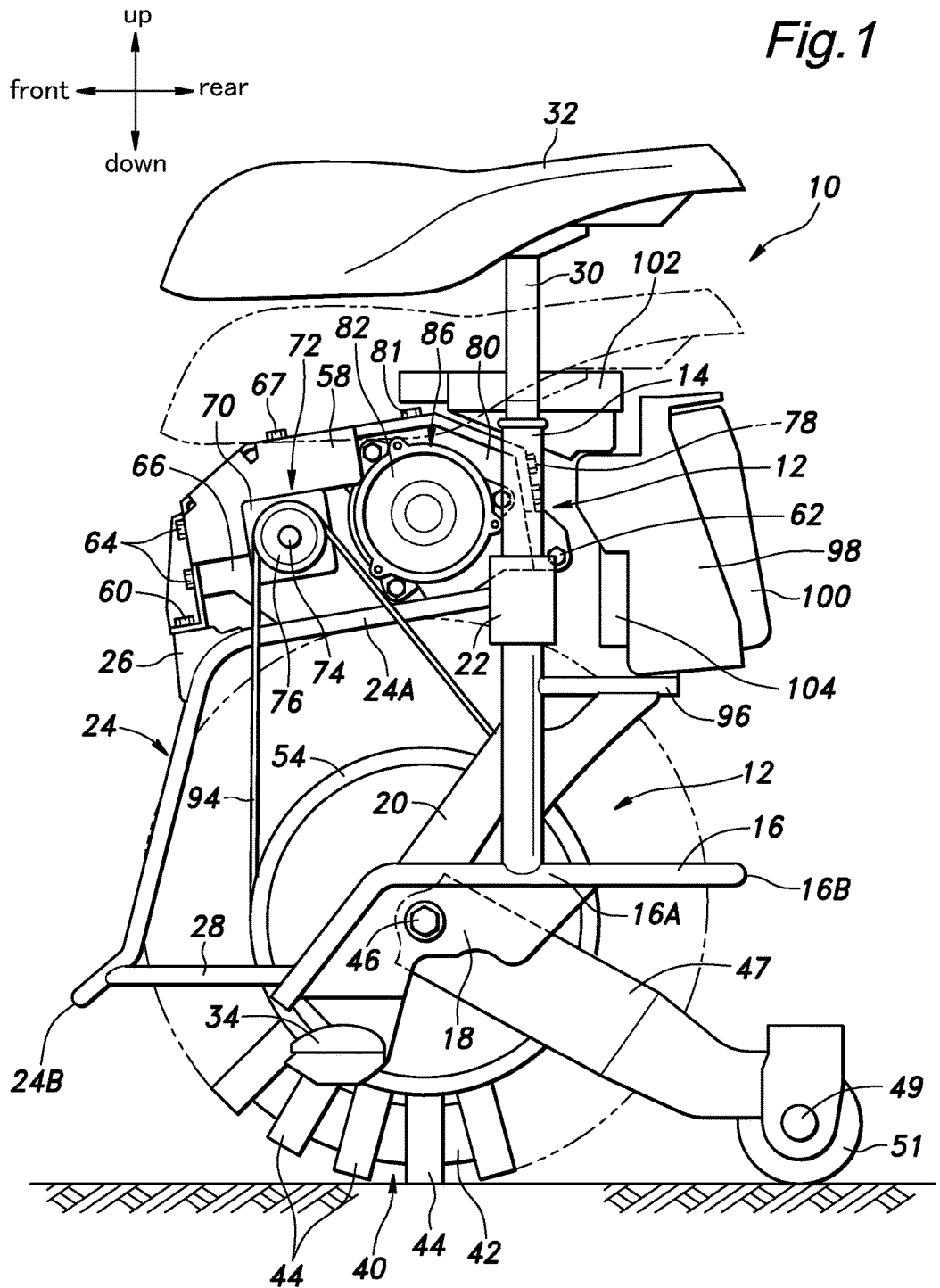
FIG. 1 is a side view of an embodiment of an inverted pendulum vehicle according to the present invention.
Figure 2:
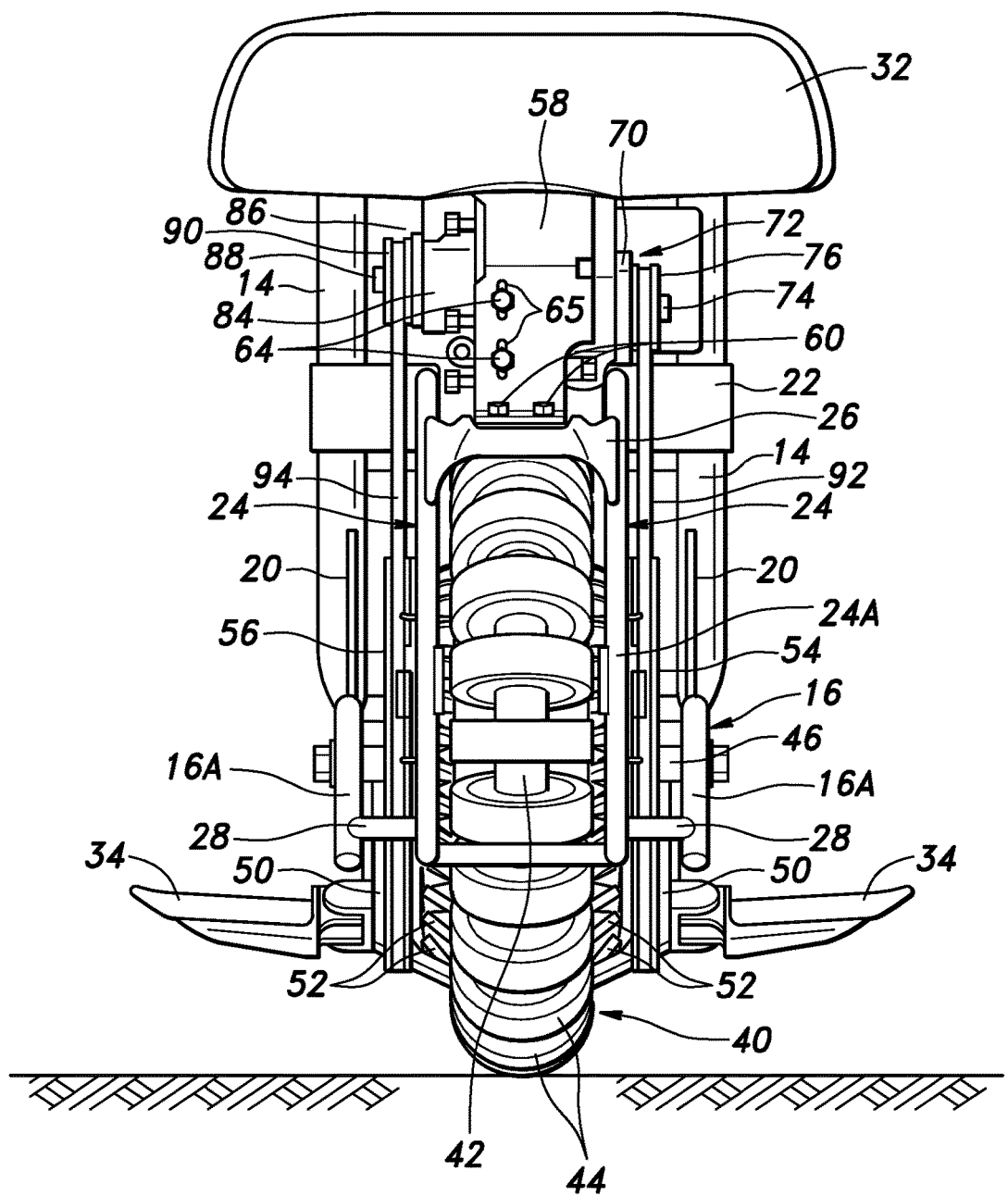
FIG. 2 is a front view of the inverted pendulum vehicle.
Figure 3:
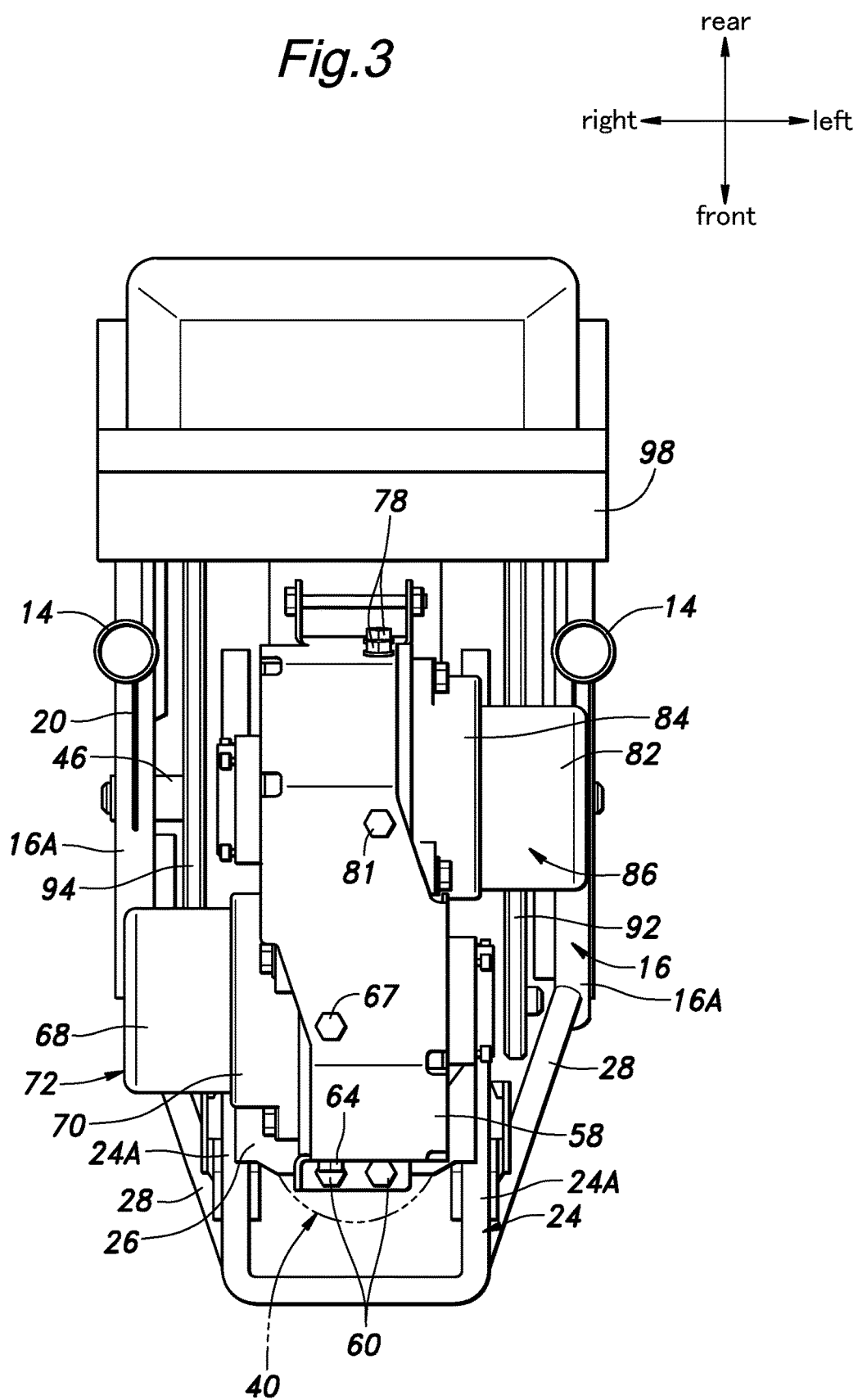
FIG. 3 is a plan view of the inverted pendulum vehicle.
Figure 4:
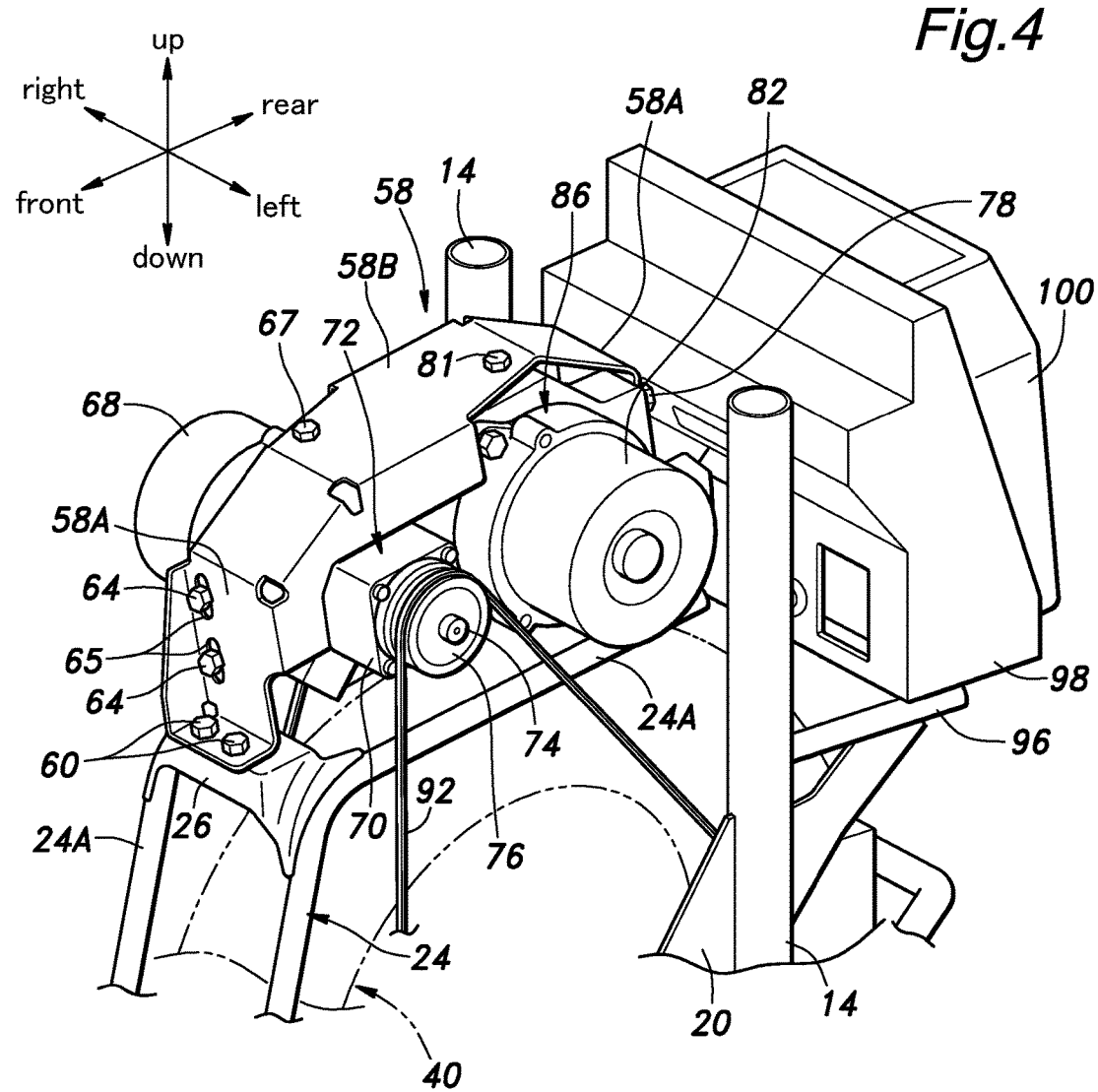
FIG. 4 is a perspective view of a part of the inverted pendulum vehicle.

An embodiment of an inverted pendulum vehicle according to the present invention is described in the following with reference to FIGS. 1 to 4. The directions mentioned in the following description are based on the viewpoint of a rider seated on the inverted pendulum vehicle.

The inverted pendulum vehicle 10 includes a vehicle body frame 12 made of pipe members. The vehicle body frame 12 includes a pair of main posts 14 located on either side of the vehicle, a lower pipe member 16 consisting of a pair of side members 16A extending along either side of the vehicle and joined to the lower ends of the respective main posts 14 at intermediate points thereof, and a rear cross member 16B extending between rear ends of the two side members 16A, a pair of lower plates 18 extending downward from the lower ends of the respective side members 16A, a pair of brace members 29 extending obliquely between the front sides of the respective main posts 14 and the upper sides of front parts of the respective side members 16A, a main cross member 22 extending between intermediate points of the main posts 14, an upper pipe member 24 consisting of a pair of side members 24A extending forward from the respective main cross member 22 along either side of the vehicle and bent downward at the front end pars thereof, and a front cross member 24B extending between the front ends of the respective side members 24A, and a pair of front pipe members 28 extending between the front ends of the respective side members 16A of the lower pipe member 16 and the corresponding front ends of the side members 24A of the upper pipe member 24. The intermediate parts of the two upper pipe members 24 bent downward are connected to each other by an upper front cross member 26 made of stamp formed sheet metal.

A saddle 32 is provided with a pair of saddle posts 30 depending therefrom in a laterally spaced apart relationship, and these saddle posts 30 are slidably inserted in the upper ends of the respective main posts 14 in an adjustable manner by means of an adjustment mechanism not shown in the drawings. Each lower plate 18 is fitted with a foot rest 34 for placing the corresponding leg of the rider.

In the illustrated embodiment, when the rider is seated on the saddle 32, the gravitational center of the vehicle 10 including the rider is positioned slightly on the front side of the vertical plumb line passing through the rotational center line of the main wheel 40.

The two main posts 14, the two side members 16A of the lower pipe member 16, the lower plates 18 and the side members 24A of the upper pipe member 24 jointly flank the main wheel 40 and a pair of drive disks 50.

The main wheel 40 is provided with an omni-wheel configuration, and includes a metallic annular member 42 having a laterally extending center line, and a plurality of driven rollers (free rollers) 44 rotatably supported by the annular member 42. Each driven roller 44 is provided with an outer peripheral part made of rubber material, and is rotatable around the tangential line of the annular member 42 at which the particular driven roller 44 is supported.

Each drive disk 50 is rotatably supported by the corresponding lower plate via a common shaft 46 extending laterally such that the two drive disks can be individually rotated around a common rotational center line.

A plurality of metallic drive rollers (free rollers) 52 are supported on a peripheral part of each drive disk 50 along a circumferential direction at a regular interval in an individually rotatable manner. The two drive disks 50 along with the drive rollers 52 are arranged in a symmetric manner or as a mirror image of each other, and the rotational center lines of the drive rollers 52 are in a skewed relationship to the rotational center line of the drive disks 50.

The drive rollers 52 of each drive disk 50 are pressed against the outer circumferential surfaces of the driven rollers 44 of the main wheel 40 such that the main wheel 40 is rotatably supported around the rotational center line thereof which is substantially coaxial to those of the drive disks 50 (but this does not limit the scope of the present invention). Thus, the main wheel 40 is allowed to rotate around the rotational center line thereof without requiring a pivot shaft.

A driven pulley 54, 56 for a cogged belt is coaxially attached to the outer periphery of each drive disk 50. Any other types of belts and chain links may also be used instead of the cogged belt.

A base end of a tail arm 47 is pivotally attached to the common shaft 46 around a laterally extending rotational center line. A tail wheel 51 is rotatably supported by a rear end (free end) of the tail arm 47 around a laterally extending rotational center line.

As shown in FIGS. 1 to 4, the upper sides of the side members 24A of the of the upper pipe member 24 jointly support a drive unit mounting bracket 58. The drive unit mounting bracket 58 consists of a stamp formed sheet metal including a pair of leg portions 58A extending vertically at the front and rear ends thereof and a roof portion 58B extending between the upper ends of the leg portions 58A. The roof portion 58B has a substantially horizontal major plane, and the leg portions 58A have a vertically and laterally extending major plane. The base end of the front leg portion 58A is attached to the upper front cross member 26 by using screws 60, and the base end of the rear leg portion 58A is attached to the main cross member 22 by using screws 62. The roof portion 58B extends in the fore and aft direction, and is located between the saddle 32 and the main wheel 40. The drive unit mounting bracket 58 may be provided with side flanges extending between the front leg portion 58A and the roof portion 58B along the side edges thereof.

A vertically extending front mounting plate 66 is attached to a front part of the drive unit mounting bracket 58 with screws 64. A left drive unit 72 including an electric motor 68 and a speed reduction unit 70 is attached to the front mounting plate 66. The electric motor 68 is attached to the right side of the mounting plate 66, and the output shaft of the speed reduction unit 70 fitted with a drive pulley 76 extends leftward.

A vertically extending rear mounting plate 80 is attached to a rear part of the drive unit mounting bracket 58 with screws 78. A right drive unit 86 including an electric motor 82 and a speed reduction unit 84 is attached to the rear mounting plate 80. The electric motor 82 is attached to the left side of the mounting plate 66, and the output shaft of the speed reduction unit 84 fitted with a drive pulley 90 extends rightward.

The left drive unit 72 and the right drive unit 86 are provided with an identical structure, and are positioned in a symmetric relationship to each other about a vertical plane perpendicular to the lateral direction. Also, the left drive unit 72 and the right drive unit 86 are positioned one behind the other, and are positioned on a same circle centered around the rotational center line of the main wheel 40. The right drive unit 86 is positioned substantially on the vertical plumb line passing through the rotational center line of the main wheel 40 when the vehicle is in operation and stands upright. The left drive unit 72 is located in front of the right drive unit 86, and overlaps with the right drive unit 86 in front view.

An endless cogged belt 92 is passed around the left drive pulley 76 and the left driven pulley 54. Another endless cogged belt 94 is passed around the right drive pulley 90 and the right driven pulley 54. Thereby, the two drive disks 50 can be individually driven by the left drive unit 72 and the right drive unit 86.

The screws 64 for attaching the front mounting plate 66 to the drive unit mounting bracket 58 are passed through vertically elongated slots 65 formed in the front leg portion 58A of the drive unit mounting bracket 58 and threaded into threaded holes formed in the front mounting plate 66. Similarly, the screws 78 for attaching the rear mounting plate 80 to the drive unit mounting bracket 58 are passed through vertically elongated slots (which are not shown in the drawings) formed in the rear leg portion 58A of the drive unit mounting bracket 58 and threaded into threaded holes formed in the rear mounting plate 80. An adjustment screw 67 is passed through an opening formed in the roof portion 58B of the drive unit mounting bracket 58, and is threaded into a threaded hole formed in the front mounting plate 66, and another adjustment screw 81 is passed through an opening formed in the roof portion 58B of the drive unit mounting bracket 58, and is threaded into a threaded hole formed in the rear mounting plate 80.

Thus, the vertical position of the front mounting plate 66, and hence, the tension of the endless cogged belt 92 can be individually adjusted by turning the adjustment screw 67. Similarly, the vertical position of the rear mounting plate 80, and hence, the tension of the endless cogged belt 94 can be individually adjusted by turning the adjustment screw 81.

A rear pipe member 96 extends rearward from rear ends of intermediate points of the main posts 14, and includes a pair of fore and aft pieces extending rearward from the rear ends of the intermediate points of the respective main posts 14, and a cross piece extending between the rear ends of the fore and aft pieces. A brace extends obliquely between the lower side of each fore and aft piece and the rear side of a part of the corresponding main post 14 located below the fore and aft piece. A battery box 98 is mounted on the upper side of the rear pipe member 96 to detachably receive a battery 100 therein. The battery 100 and the battery box 98 are positioned behind the two drive units 72 and 86, and between the main wheel 40 and the saddle 32. The battery 100 supplies electric power to the electric motors 68 and 82 and various onboard units such as a main wheel PDU 102.

The main wheel PDU 102 is supported by upper parts of the main posts 14 so as to be positioned immediately under the saddle 32. The main wheel PDE 102 includes a computer for controlling the electric motors 68 and 82 in such a manner that the inverted pendulum control and the propulsion control of the vehicle may be performed according to various sensor signals such as an output signal from a gyro sensor 104 attached to the battery box 98.

When the gravitational center of the vehicle 10 including the rider is at the neutral position (or on the vertical line passing through the rotational center line of the main wheel 40), the electric motors 68 and 82 are driven in such a manner that the vehicle body frame 12 is maintained in an upright posture.

When the gravitational center of the vehicle 10 including the rider is shifted forward, for instance by the rider leaning forward, the main wheel PDU 102 commands the electric motors 68 and 82 to rotate in the normal direction at a same speed. As a result, the main wheel 40 rotates in the normal direction around the rotational center line thereof, and the vehicle 10 travels straight forward. At this time, as there is no speed difference between the two drive disks 50, the drive rollers 52 of the drive disks 50 and the driven rollers 44 of the main wheel 40 do not rotated around the respective rotational center lines so that no lateral movement takes place.

When the gravitational center of the vehicle 10 including the rider is shifted rearward, for instance by the rider leaning rearward, the main wheel PDU 102 commands the electric motors 68 and 82 to rotate in the reverse direction at a same speed. As a result, the main wheel 40 rotates in the reverse direction around the rotational center line thereof, and the vehicle 10 travels straight rearward. At this time, as there is no speed difference between the two drive disks 50, the drive rollers 52 of the drive disks 50 and the driven rollers 44 of the main wheel 40 do not rotated around the respective rotational center lines so that no lateral movement takes place.

When the gravitational center of the vehicle 10 including the rider is shifted sideways, for instance by the rider leaning sideways, the main wheel PDU 102 commands the electric motors 68 and 82 to rotate in different directions and/or at different speeds. This causes a difference between the rotational speeds of the two drive disks 50. As a result, the driven rollers 44 of the main wheel 40 are driven by the drive rollers 52 of the drive disks 50, and rotate around the rotational center lines of the driven rollers 44.

The rotational speed of the driven rollers 44 depend on the difference between the rotational speeds of the drive disks 50. For instance, when the two drive disks 50 are rotated at a same speed in different directions, the main wheel 40 does not rotate around the rotational center line thereof, and only the driven rollers 44 rotate around the respective rotational center lines. As a result, the vehicle 10 travels sideways. By rotating the drive disks 50 in a same direction at different speeds, the main wheel 40 rotates around the rotational center line thereof, and the driven rollers 44 rotate around the respective rotational center lines at the same time so that the vehicle 10 travels in an oblique direction.

Because the left drive unit 72 and the right drive unit 86 are positioned one behind the other between the main wheel 40 and the saddle 32, the vertical dimension of the space for accommodating the two drive units 72 and 86 can be minimized as compared to the case where the left drive unit 72 and the right drive unit 86 are positioned one above the other. Therefore, the position of the saddle 32 is prevented from becoming excessively high. As the battery 100 is positioned behind the drive units, the battery does not interfere with the positioning the saddle 32. Also, the positioning of the battery 100 in the rear part of the vehicle 10 enhances the accessibility of the battery 100.

As the left drive unit 72 and the right drive unit 86 are positioned so as to overlap each other in front view, the lateral dimension of the space for accommodating the two drive units 72 and 86 can be minimized as compared to the case where the left drive unit 72 and the right drive unit 86 are positioned one next to the other. Thereby, the rider is not required to excessively spread the legs to be seated on the saddle 32 even when the rider is of a short stature.

As the left drive unit 72 and the right drive unit 86 are positioned on a same circle centered around the rotational center line of the main wheel 40, the cogged belts 92 and 94 for the two drive units 72 and 86 may be of a same configuration.

As the left drive unit 72 and the right drive unit 86 are of an identical configuration, and are a mirror image of each other, common component parts may be used for the two drive units 72 and 86, and the lateral balance of the vehicle 10 can be enhanced.

When the vehicle body frame 12 is in an upright posture, the right drive unit 86 is substantially on the plumb vertical line passing through the rotational center line of the main wheel 40, and the left drive unit 72 is located in front of the right drive unit 86, the fore and aft balance of the vehicle including the rider can be enhanced.

Figure 5:
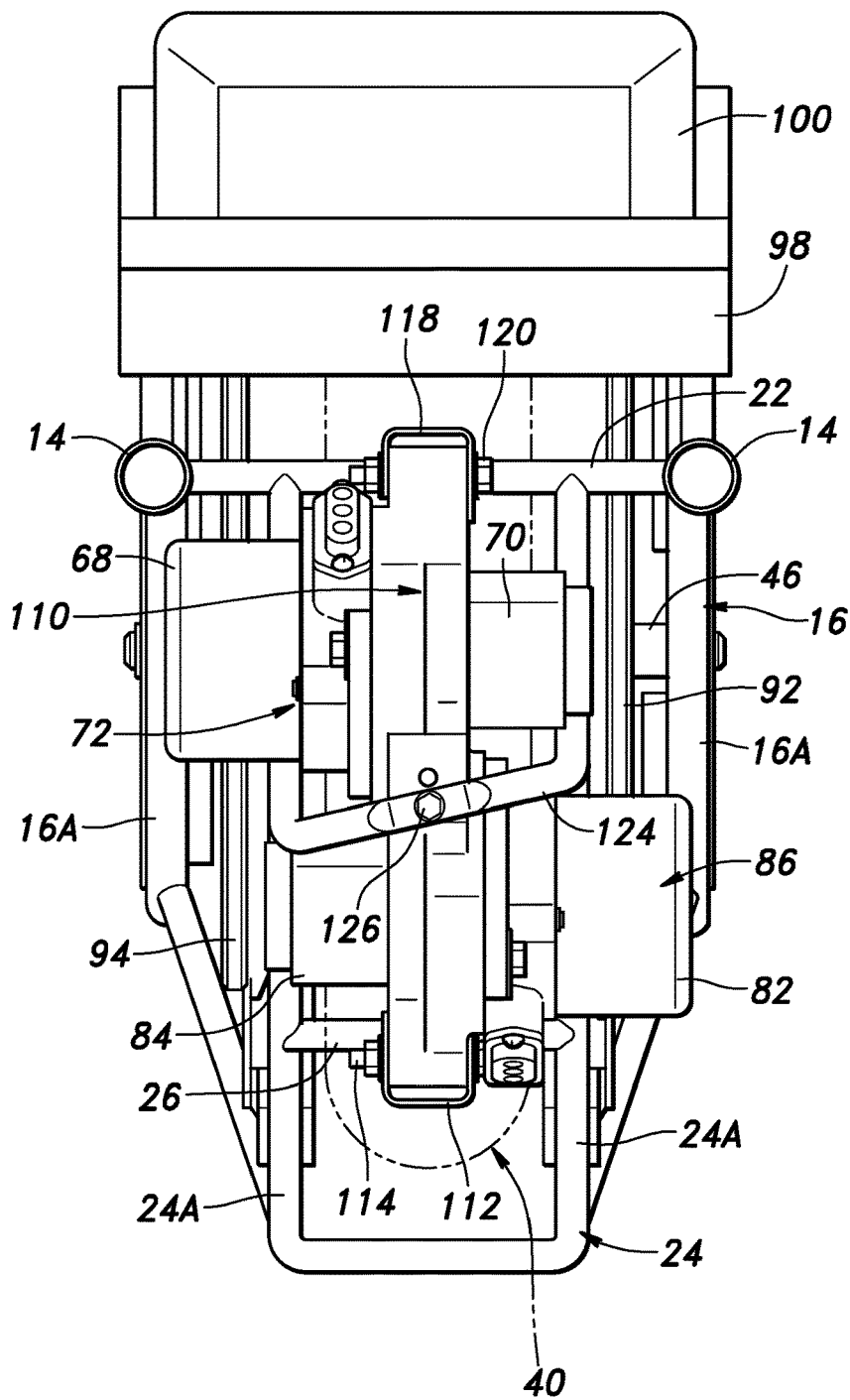
FIG. 5 is a plan view of an alternate embodiment of an inverted pendulum vehicle according to the present invention.
Figure 6:
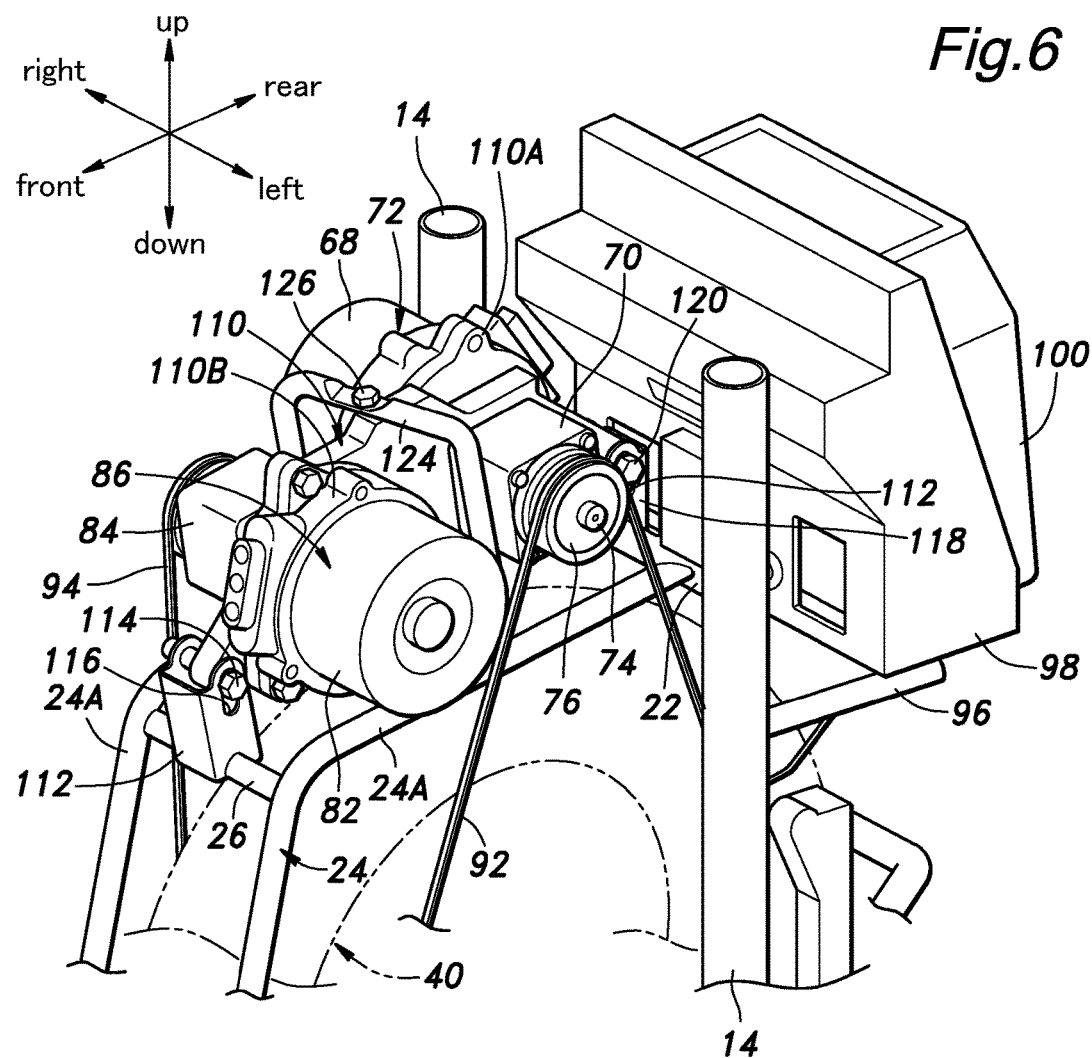
FIG. 6 is a perspective view of a part of the inverted pendulum vehicle shown in FIG. 5.

An alternate embodiment of the present invention is described in the following with reference to FIGS. 5 to 7. In the following description, the parts corresponding to those of the foregoing embodiment are denoted with like numerals without necessarily repeating the description of such parts.

In this embodiment, the drive units 72 and 86 are attached to a common mounting plate 110 positioned upright above the upper pipe member 24 and having a major plane extending perpendicular to the lateral direction. A front end of the mounting plate 110 is connected to a front cross member 26 (consisting of a pipe member in this case) of the upper pipe member 24 via a front bracket 112. In the illustrated embodiment, the front bracket 112 is welded to the front cross member 26, and the front end of the mounting plate 110 is connected to the front cross member 26 via a threaded bolt 114. A rear end of the mounting plate 110 is connected to the main cross member 22 via a rear bracket 118. In the illustrated embodiment, the rear bracket 118 is welded to the main cross member 22, and the rear end of the mounting plate 110 is connected to the main cross member 22 via a threaded bolt 120.

The threaded bolts 114 and 120 are passed through vertically elongated slots 116 and 122 formed in the front bracket 112 and the rear bracket 118, respectively so that the vertical position of the mounting plate 110 relative to the vehicle body frame 12 can be adjusted.

A pair of motor mounting portions 110A and 110B are provided in the mounting plate 110 one behind the other on the opposite sides of the mounting plate 110. The electric motor 68 for the left drive unit 72 is attached to the rear motor mounting portion 110A positioned on the right side of the mounting plate 110, and the output shaft of the electric motor 68 is passed through an opening formed in the mounting plate 110. The speed reduction unit for the left drive unit 72 is connected to the output shaft of the electric motor 68, and attached to the left side of the mounting plate 110. The electric motor 82 for the right drive unit 86 is attached to the front motor mounting portion 110B positioned on the left side of the mounting plate 110, and the output shaft of the electric motor 82 is passed through an opening formed in the mounting plate 110. The speed reduction unit for the right drive unit 86 is connected to the output shaft of the electric motor 82, and attached to the right side of the mounting plate 110.

A gate shaped central pipe member 124 is attached to the side members 24A of the upper pipe member 24. The central pipe member 124 includes a pair of upright leg pieces connected to the upper pipe member at the lower ends thereof and a cross piece extending between the upper ends of the leg pieces. An adjustment screw 126 is passed downward through the cross piece of the central pipe member 124, and the free end of the adjustment screw 126 is threaded into a threaded hole formed in the upper end of the mounting plate 110. Thus, by loosening the threaded bolt 114 and 120, and turning the adjustment screw 126, the tension of the cogged belts 92 and 94 can be adjusted.

In this embodiment also, the left drive unit 72 and the right drive unit 86 are provided with an identical structure, and are positioned in a symmetric relationship to each other about a vertical plane perpendicular to the lateral direction. Also, the left drive unit 72 and the right drive unit 86 are positioned one behind the other, and are positioned on a same circle centered around the rotational center line of the main wheel 40. The left drive unit 72 is positioned substantially on the vertical line passing through the rotational center line of the main wheel 40 when the vehicle is in operation and stands upright. The right drive unit 86 is located in front of the left drive unit 72, and overlaps with the left drive unit 72 in front view.

In this embodiment also, because the left drive unit 72 and the right drive unit 86 are positioned one behind the other between the main wheel 40 and the saddle 32, the vertical dimension of the space for accommodating the two drive units 72 and 86 can be minimized as compared to the case where the left drive unit 72 and the right drive unit 86 are positioned one above the other. Therefore, the position of the saddle 32 is prevented from becoming excessively high. As the battery 100 is positioned behind the drive units, the battery does not interfere with the positioning of the saddle 32. Also, the positioning of the battery 100 in the rear part of the vehicle 10 enhances the accessibility of the battery 100.

As the left drive unit 72 and the right drive unit 86 are positioned so as to overlap each other in front view, the lateral dimension of the space for accommodating the two drive units 72 and 86 can be minimized as compared to the case where the left drive unit 72 and the right drive unit 86 are positioned one next to the other. Thereby, the rider is not required to excessively spread the legs to be seated on the saddle 32 even when the rider is of a short stature.

As the left drive unit 72 and the right drive unit 86 are positioned on a same circle centered around the rotational center line of the main wheel 40, the cogged belts 92 and 94 for the two drive units 72 and 86 may be of a same configuration.

As the left drive unit 72 and the right drive unit 86 are of an identical configuration, and are a mirror image of each other, common component parts may be used for the two drive units 72 and 86, and the lateral balance of the vehicle 10 can be enhanced.

When the vehicle body frame 12 is in an upright posture, the right drive unit 86 is substantially on the plumb vertical line passing through the rotational center line of the main wheel 40, and the left drive unit 72 is located in front of the right drive unit 86, the fore and aft balance of the vehicle including the rider can be enhanced.

Also, by turning the adjustment screw 126 with the threaded bolt 114 and 120 loosened, the tension of the two cogged belts 92 and 94 can be adjusted simultaneously.

Although the present invention has been described in terms of a preferred embodiment thereof, it is obvious to a person skilled in the art that various alterations and modifications are possible without departing from the scope of the present invention.

The invention claimed is:

1. An inverted pendulum vehicle, comprising:
   a vehicle body frame;
   a main wheel combining a plurality of free rollers arranged along a circle such that rotational center lines of the free rollers are each directed along a tangential line of the circle;
   a pair of drive disks each carrying a plurality of free rollers arranged along a circumferential direction and configured to engage the free rollers of the main wheel;
   a pair of drive units including a pair of electric motors for individually driving the drive disks under an inverted pendulum control;
   a battery mounted on the vehicle body frame to supply electric power to the electric motors; and
   a saddle mounted on the vehicle body frame for seating a rider;
   wherein the two drive units are positioned one behind the other between the saddle and a rotational center line of the main wheel.

2. The inverted pendulum vehicle according to claim 1, wherein one of the drive units is positioned substantially on a vertical line passing through the rotational center line of the main wheel in an upright condition of the vehicle, and the other drive unit is positioned in front of the one drive unit.

3. The inverted pendulum vehicle according to claim 1, wherein the drive units are provided with respective drive pulleys, the drive disks are provided with respective driven pulleys, and an endless belt is passed around each drive pulley and the corresponding driven pulley, the two drive units being positioned on a same circle centered around the rotational center line of the main wheel.

4. The inverted pendulum vehicle according to claim 1, wherein the two drive units are arranged such that output ends of the drive units are directed away from each other.

5. The inverted pendulum vehicle according to claim 4, wherein the two drive units are arranged such that the two drive units overlap each other in front view.

6. The inverted pendulum vehicle according to claim 1, wherein the two drive units are mounted on the vehicle body frame via a common mounting member in an individually adjustable manner.

7. The inverted pendulum vehicle according to claim 6, wherein the mounting member comprises a vertical plate member extending orthogonally to a lateral direction, and the electric motors of the two drive units are mounted on opposite sides of the vertical plate.

8. The inverted pendulum vehicle according to claim 1, wherein the battery is positioned behind the drive units.

* * * * *